(12) United States Patent
Weydert et al.

(10) Patent No.: US 7,468,153 B2
(45) Date of Patent: Dec. 23, 2008

(54) DEGRADABLE BLADING FOR TIRE CURING MOLDS

(75) Inventors: Marc Weydert, Strassen (LU); Frank Schmitz, Bissen (LU); Rene Jean Zimmer, Howald (LU); Bernd Fuchs, Konz (DE)

(73) Assignee: The Goodyear Tire & Rubber Co., Akron, OH (US)

( * ) Notice: Subject to any disclaimer, the term of this patent is extended or adjusted under 35 U.S.C. 154(b) by 228 days.

(21) Appl. No.: 11/095,449

(22) Filed: Mar. 31, 2005

(65) Prior Publication Data

US 2006/0151079 A1 Jul. 13, 2006

Related U.S. Application Data

(60) Provisional application No. 60/640,661, filed on Dec. 30, 2004.

(51) Int. Cl.
*B29C 33/52* (2006.01)
*B29D 30/52* (2006.01)
*B60C 11/12* (2006.01)

(52) U.S. Cl. ............... 264/317; 152/209.5; 152/209.17; 152/DIG. 3; 264/DIG. 44; 425/28.1; 425/46; 425/176

(58) Field of Classification Search ............. 152/209.5, 152/209.17, 209.18, DIG. 3; 425/176, 28.1, 425/37, 46; 264/DIG. 44, 317; 156/155; *B29C 33/52*
See application file for complete search history.

(56) References Cited

U.S. PATENT DOCUMENTS

| | | | | |
|---|---|---|---|---|
| 1,762,723 A * | 6/1930 | Manly et al. | ................. | 425/176 |
| 2,983,005 A | 5/1961 | Spier | ........................... | 22/160 |
| 3,014,614 A | 12/1961 | Carroll et al. | ................. | 220/83 |
| 3,415,923 A * | 12/1968 | Petersen | ..................... | 264/221 |
| 4,807,679 A | 2/1989 | Collette et al. | .......... | 152/209 R |
| 5,964,118 A | 10/1999 | Kamata | ...................... | 72/286 |
| 6,045,745 A * | 4/2000 | Reno | .......................... | 264/317 |
| 6,484,772 B1 * | 11/2002 | De Labareyre et al. | . . | 152/209.17 |
| 6,484,773 B1 | 11/2002 | Bruant | .................... | 152/209.4 |
| 2002/0053383 A1 | 5/2002 | Kleinhoff et al. | ...... | 152/209.18 |
| 2003/0101851 A1 | 6/2003 | Domange et al. | ............. | 76/101 |

(Continued)

FOREIGN PATENT DOCUMENTS

CA 2313192 6/1999

(Continued)

OTHER PUBLICATIONS

European Patent Office, Search Report corresponding to EP 05112692.8-2307 dated Mar. 6, 2006.

*Primary Examiner*—Steven D Maki
(74) *Attorney, Agent, or Firm*—Wood Herron & Evans LLP

(57) ABSTRACT

A degradable sipe blade for forming sipes in a tire tread, where the degradable material may be removed by exposure to water. A tire curing apparatus is also provided having a plurality of degradable sipe blades affixed to the mold surface within the tread pattern. In addition, a cured tire is provided having the degradable sipe blades embedded in the tread elements of the tire tread after removal of the cured tire from a curing mold. Further provided is a method for forming sipes in a tire tread using degradable blading.

24 Claims, 1 Drawing Sheet

U.S. PATENT DOCUMENTS

| | | | |
|---|---|---|---|
| 2004/0089384 A1* | 5/2004 | Lopez et al. | 152/209.1 |
| 2004/0134579 A1 | 7/2004 | Tanaka | 152/209.1 |
| 2006/0005905 A1* | 1/2006 | Croissant et al. | 152/209.18 |
| 2006/0090829 A1* | 5/2006 | Lopez | 152/209.18 |

FOREIGN PATENT DOCUMENTS

| | | | |
|---|---|---|---|
| DE | 195 06 697 A1 | | 8/1996 |
| EP | 471459 | * | 2/1992 |
| GB | 2227705 | | 8/1990 |
| GB | 2 275 015 A | | 8/1994 |
| JP | 5-301501 | * | 11/1993 |
| JP | 1991000077437 | | 11/1993 |
| JP | 2002-240509 | * | 8/2002 |
| WO | WO 99/29768 | | 6/1999 |
| WO | WO 2004/110791 | * | 12/2004 |

* cited by examiner

DEGRADABLE BLADING FOR TIRE CURING MOLDS

CROSS REFERENCE TO RELATED APPLICATION

Pursuant to 37 C.F.R. § 1.78(a)(4), this application claims the benefit of and priority to prior filed co-pending Provisional Application Ser. No. 60/640,661, filed Dec. 30, 2004, which is expressly incorporated herein by reference.

FIELD OF THE INVENTION

The present invention is related to a degradable sipe blade for use in a curing mold to form sipes in the tread of a vehicle tire, and to a method of using degradable sipe blades.

DEFINITIONS

"Biodegradable polymer" refers to any polymeric substance that is decomposed by microorganisms, such as bacteria, fungi, and algae, and/or natural environmental factors.

"Footprint" means the collective ground-contacting surfaces or area of contact of the tire tread with a flat surface at zero speed and under normal load and pressure.

"Groove" means an elongated void area in a tread that may extend circumferentially or laterally about the tread in a straight, curved, or zig-zag manner. Grooves ordinarily remain open in the tire footprint, and form a recessed surface in the tread. Circumferentially and laterally extending grooves sometimes have common portions and may be subclassified as "wide" or "narrow". Grooves may be of varying depths in a tire. The grooves delimit or define tread elements, and the grooves and tread elements collectively form the "tread pattern."

"Ground-contacting surface" means the top surface of the tread elements of the tread.

"Hydrolyzable polymers" refers to any polymeric substance that chemically reacts with water to form two or more new substances.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Sipe" means a small slot or slit molded into a raised feature of the tread that subdivides the tread surface and improves traction. Sipes ordinarily have a width of 1 mm or less and are closed or substantially closed in the tire footprint.

"Tread" means a molded rubber component which, when bonded to a tire casing, includes that portion of the tire that comes into contact with the road when the tire is normally inflated and under normal load, i.e., the footprint. The pattern of the tread is defined by the combination of grooves and tread elements.

"Tread elements" refer to the raised features of the tread defined by the grooves. A tread element may be variously referred to as a tread block or rib or lug, for example. The top surfaces of the tread elements are the ground-contacting surfaces.

"Water-soluble polymer" refers to any polymeric substance of high molecular weight that dissolves in water at normal temperature, including natural, semi-synthetic, and synthetic polymers.

The terms "cure" and "vulcanize" are intended to be interchangeable terms unless otherwise noted.

The terms "green" and "uncured" are intended to be interchangeable unless otherwise noted.

BACKGROUND OF THE INVENTION

Sipe blades for tire curing molds are well known in the art of tire manufacture. Such blades are conventionally made from a strip of metallic material, such as steel, stainless steel or brass. The strip of material is generally up to 1 mm thick.

The blades create sipes in a tire tread during the vulcanization step of a green tire in a curing mold. A sipe is generally understood to refer to a small slot or slit molded into a tread element of the tire that subdivides the tread surface and improves traction. Sipes are of small width, on the order of 1 mm or less, and they close or substantially close when located in the footprint of the tire, i.e., in the contact patch of the tire tread with a flat surface at zero speed and under normal load and inflation pressure. The sipes may extend circumferentially, laterally or diagonally about the tread in a straight, curved or zig-zag manner and may be as deep as the tread block and rib defining grooves. The sipes may pass through or cut one or both of opposing sides of a tread element or may be confined to its interior. Sipes are distinguished from tread grooves in that the grooves do not close up in the footprint of the tire, and generally have a width of at least 2 mm.

Sipes on the tread surfaces act as squeegees against road surfaces and thereby give the tires better traction, especially on slippery or wet roads. These sipes may vary in size and configuration to provide the desired effect. However, forming sipes of complicated and sophisticated shapes presents a challenge to the tire manufacturer.

In a typical tire building process, a tire assembly is placed into a mold with the tread strip positioned to abut a mold surface having a pattern therein corresponding to the desired tread groove/tread element pattern for the particular tire to be manufactured. A curing bladder is placed adjacent the interior of the tire assembly and expanded to force the tread strip against the mold surface thereby forming the tread pattern in the uncured tread strip. When sipes are to be formed in the tread elements, sipe blades are affixed to the mold surface such that the blades are forced into the uncured tread strip as the tread strip is forced against the mold surface. After shaping the tread, the tire assembly is then cured or vulcanized in the mold to permanently set the tread pattern. This overall process is referred to as shaping and curing.

After curing, the sipe blades must be separated from the cured tire, thereby leaving the sipes formed in the tread elements. The more sophisticated the shapes of the sipe blades are, the more difficult it is to remove the sipe blades from the cured tire. In addition, damage to the tread elements may occur upon removal of the sipe blades, which compromises the integrity of the tire tread.

There is thus a need to develop a way to form sipes in a tire tread, wherein the sipe blades are easily removed from the cured tire and do not damage the tire tread.

SUMMARY OF THE INVENTION

The present invention provides a degradable sipe blade for forming sipes in a tire tread. The sipe blades are made of a material that is a water soluble polymer, a hydrolyzable polymer, or a biodegradable polymer, or a combination thereof, that is capable of maintaining the blade shape at the vulcanization temperature, and that is capable of being removed from the cured tire tread by exposure to water. The present invention also provides a tire curing apparatus having a plurality of degradable sipe blades affixed to the recessed surfaces of the negative form of the tread pattern formed in the molding body.

The present invention further provides a tire having a tread formed from vulcanized rubber with a pattern of recessed grooves defining raised tread elements with top surfaces designed to be ground-contacting. A plurality of degradable sipe blades are positioned in the raised tread elements adjacent the top surfaces. After the sipe blades degrade, they leave a pattern of sipes in the raised tread elements. The present invention also provides a method of forming sipes, including affixing the degradable sipe blades in the curing mold, forcing an uncured tread strip into the mold whereby the sipe blades are forced into the tread strip, curing the tread strip by applying the vulcanization temperature, removing the cured tread from the mold including releasing the sipe blades from the mold to thereby leave them embedded in the tread, and exposing the sipe blades to water to remove the sipe blades thereby leaving a pattern of sipes in the tire tread.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
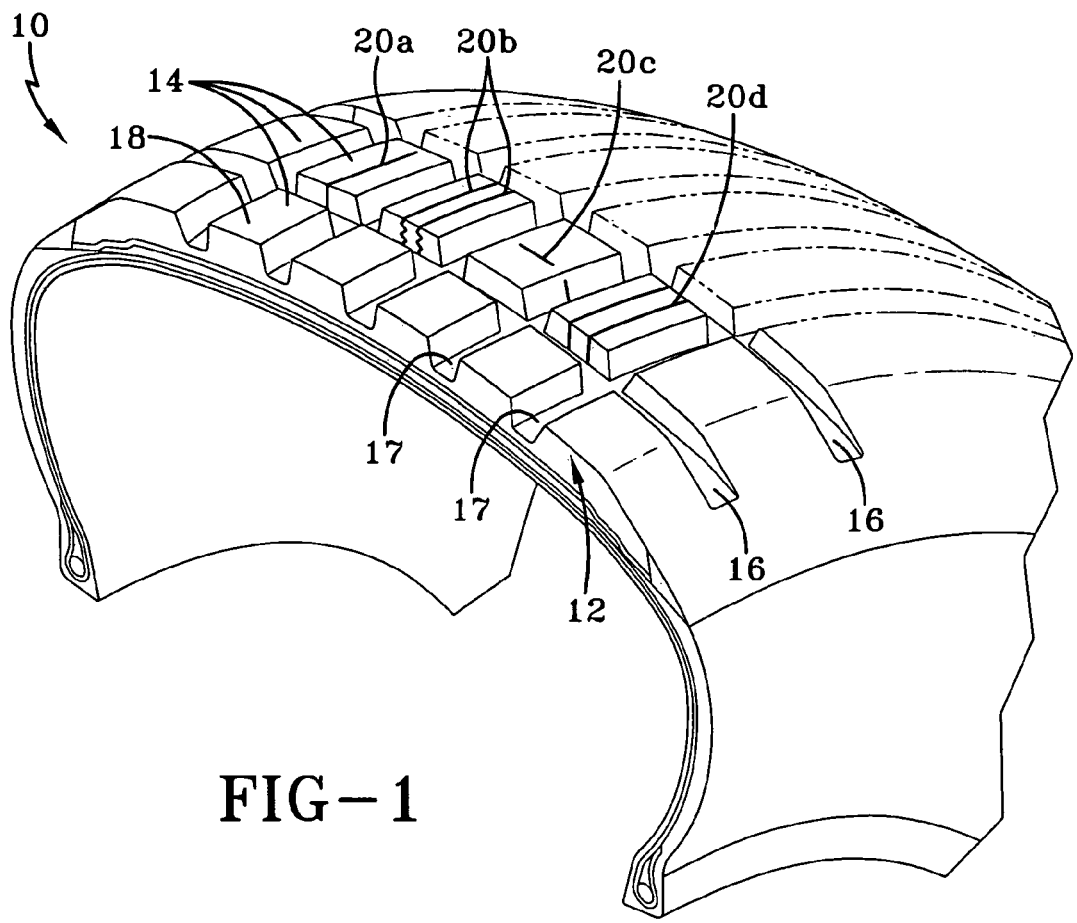
FIG. 1 is a perspective view of a tire having a plurality of sipes formed in the tread elements.

FIG. 1 depicts in perspective view a cured tire 10 having a tread 12 comprising a plurality of tread elements 14 defined by a plurality of laterally-extending grooves 16 and circumferentially-extending grooves 17. Each tread element 14 includes a ground-contacting top surface 18. Extending from the ground-contacting top surfaces 18 into the tread elements 14 are a plurality of sipes 20a, 20b, 20c and 20d. The sipes 20a-d may extend into the respective tread element 14 to a depth less than the depth of the tread element 14, or may extend from the ground-contacting top surface 18 to the full depth of the tread element 14. Also, the sipes may extend the full circumferential length or lateral width of the tread element, or less than the full length or width. Sipe 20a, for example, is open to one of the lateral grooves 16, but is otherwise internal to the tread element 14. Sipes 20b and 20d extend the full circumferential length of their respective tread elements 14 to open to both laterally-extending grooves 16, and the sipes extend from the ground-contacting top surface 18 to the full depth of the tread element 14. Sipes 20b further have a zig-zag shape extending through the tread element 14. Sipe 20c extends in the lateral direction rather than the circumferential direction, and does not extend the full lateral length of the tread element 14 at the ground-contacting top surface 18, but at some depth down into the tread element 14 does extend the full lateral length so as to open to the circumferentially-extending grooves 17. Thus, as depicted in FIG. 1, sipes 20a-d may be formed in tread elements 14 with any shape or pattern, and may be internal to the tread elements 14 or may open to one or more of the laterally or circumferentially-extending grooves 16 and 17, and may extend the full depth of the tread elements 14 or less than the full depth of the tread elements 14 from the ground-contacting top surfaces 18.

In accordance with the present invention, degradable sipe blades are used to form sipes 20a-d in the tire tread 12. The degradable sipe blades are affixed to the tread pattern-forming surface of a tire curing mold. Specifically, the degradable sipe blades are affixed to recessed surfaces of the negative form of the tread pattern in the mold that form the ground-contacting top surfaces 18 of the tread elements 14 in the positive form of the tread pattern on the cured tire 10. Thus, when an uncured tread strip is pressed into the curing mold, the tread strip receives the sipe blades as the tread elements 14 are formed. To state another way, the sipe blades are forced in the tread strip as the tread strip is forced into the mold. The degradable sipe blades must have sufficient strength to penetrate the uncured tread strip while maintaining their shape, and must be capable of withstanding the vulcanization temperature and pressure applied to the tire curing mold and the green tire compound therein without losing shape or prematurely dissolving. After curing, the degradable sipe blades are releasable from the mold surface as the cured tire is removed from the mold, thereby leaving the degradable sipe blades in the cured tire tread.

Figure 2:
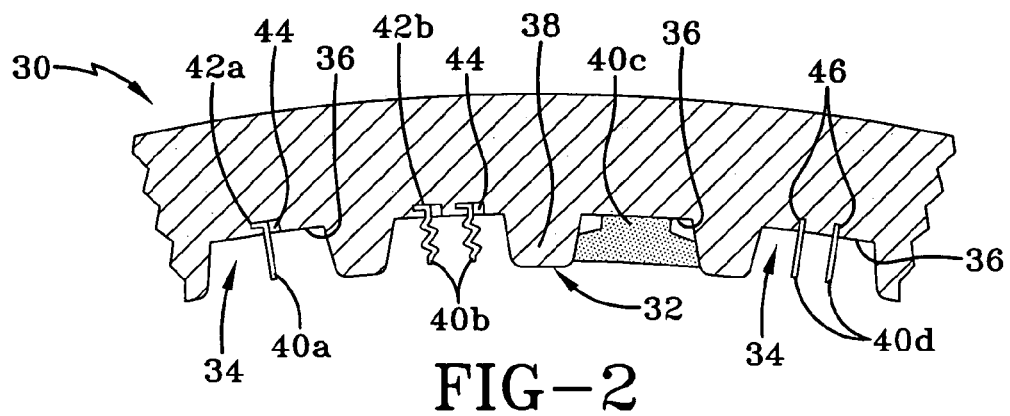
FIG. 2 is a cross-sectional view of a tire molding surface for forming a tread pattern, and having degradable sipe blades affixed to the surface.

Referring to FIG. 2, a portion of a tire curing mold 30 is depicted in cross-section. A negative form of the pattern for the desired tread pattern of the tire is formed in the surface 32 of the tire curing mold 30. Recesses 34 have the negative form of the tread elements 14 to be formed in the tire tread 12. Recessed surfaces 36 in the negative form correspond to the ground-contacting top surfaces 18 to be formed on the tire tread 12 cured in the molds 30. The non-recessed portions 38 have the negative form of the grooves 16 and 17 to be formed in the tire tread 12. A sipe blade 40a is affixed to the mold 30 at a surface 36 and extends through the respective recess 34 to a desired depth relative to the depth of the recess 34. A notch 44 is provided in the mold surface 36 to receive a hooked end 42a of the sipe blade 40a for affixing the sipe blade 40a to the mold 30. Similarly, sipe blades 40b have a zig-zag configuration, and extend through the desired depth of another recess 34 with hooked ends 42b secured in notches 44. Sipe blade 40c is secured to the mold 30 by means of a friction fit within another recess 34, such that the sipe blade 40c exists entirely within the recess 34 and does not extend into the surface 36. Sipe blades 40d extend into the surface 36 into slots 46 by means of friction fitting. Thus, it may be appreciated that the degradable sipe blades 40a-40d of the present invention may be secured or affixed to the mold surface by any desired means, such as notch fitting or friction fitting, either manually or robotically, as desired by the tire manufacturer. Alternatively, injection molding techniques well known to those in the art of molding technology may be used to form injection molded sipe blades. The means for affixing the sipe blades 40a-40d to the mold 30 should be sufficient to hold the blade in position when the tread strip is forced into the mold 30, specifically into the recesses 34, to ensure proper orientation of the sipes 20a-d formed from the sipe blades 40a-d in the cured tire 10.

Figure 3:
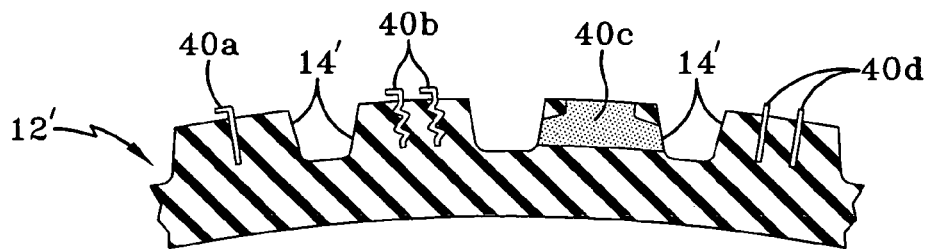
FIG. 3 is a cross-sectional view of a cured tire tread having degradable sipe blades therein.

Depicted in cross-section in FIG. 3, is a cured tire tread 12' having the degradable sipe blades 40a-d positioned in the tread elements 14'. After the tire tread 12' has been cured in the mold 30 of FIG. 2, the cured tire must be removed from the mold 30. When removed, the degradable sipe blades 40a-40d are released from the mold surface 32. As may be appreciated by persons skilled in the art, the strength of the connection between the cured tire tread 12' and the sipe blades 40a-d may be made stronger than the connection between the sipe blades 40*a-d* and the mold surface 32, such that the sipe blades will remain embedded in the tread elements 14' and release from the mold surface 32.

In accordance with the present invention, the sipe blades 40*a-d* are degradable. Thus, after the cured tire tread 12' having the degradable sipe blades 40*a-d* therein is removed from the mold 30, as depicted in FIG. 3, the sipe blades 40*a-d* are removed to provide the cured tire 10 having a pattern of sipes 20*a-d* formed therein. Rather than physically removing the sipe blades 40*a-d*, which may damage the tread elements 14 and which may be difficult for very intricate sipe patterns, the sipe blades 40*a-d* are removed by chemical degradation, which may involve an active process for degrading the material and/or a passive process wherein the material degrades over time. Specifically, the sipe blades 40*a-d* are removed by exposing them to water, which either chemically reacts with the blade material or dissolves the blade material. The exposure to water may be prior to tire use or during tire use by virtue of moisture on the environment, or a combination thereof.

In some embodiments of the present invention, the sipe blades comprise a hydrolyzable thermoplastic material that is removed from the tire tread 12' by chemical reaction with an aqueous solvent or a water-soluble thermoplastic material that is removed from the tire tread 12' by dissolution with an aqueous solvent. The aqueous solvent may be entirely water, or may be water in combination with an acid or a base. Examples of hydrolyzable or water-soluble thermoplastics include polyacrylic acids, polyacryl amides, polyvinyl alcohols, polyoxyethylenes, polyesters, or polyamides, or copolymers thereof, or combinations thereof. In one embodiment, the thermoplastic material is a vinyl polymer, such as polyvinyl acetate or polyvinyl alcohol. In another embodiment, the material is a hydrolyzable polyester, such as polyglycolic acid, polylactic acid, polycaprolactone, polyhydroxybutyrate, or polyhydroxyvalerate, or copolymers thereof, or combinations thereof.

As non-limiting examples, the exposure to water may be accomplished by spraying the tire tread with the aqueous solvent, by immersing the tire tread in a solvent bath, or by any other known or hereafter-developed technique. Thus, an active process for degrading the sipe blades 40*a-d* involves chemically reacting or dissolving the blade material. Passive-type degradation may also be used by routine exposure of the sipe blades to water during use of the tire in a wet environment, such as use of the tire in rain or snow. In addition, a combination of active and passive degradation may be used, for example, a portion of the sipe blades 40*a-d* nearest the ground-contacting top surface 18 of the tire 10 may be removed actively, while the remaining portion of the sipe blades 40*a-d*, which are embedded deeper in the tread and may be in complex patterns, are removed during use of the tire 10 as the tread 12 wears down over time thereby gradually exposing the remaining portions of the sipe blades 40*a-d*.

The addition of acids or bases to the aqueous solvent may be used to assist and/or accelerate the degradation by water. Also, the use of heat may be used to assist and/or accelerate the degradation. For example, the tire may be immersed in a heated solvent bath. Further, exposure to actinic light may be used to accelerate the degradation. It may be understood, however, that aids for assisting/accelerating degradation of the sipe blades should not be used if damage to the tire tread occurs as a result of their use. Water is harmless to the tire tread and to the environment, and thus represents the safest and most environmentally-friendly means for forming sipes by degradation of sacrificial blades.

In another embodiment of the present invention, the sipe blades comprise a biodegradable material that can passively degrade gradually over time upon exposure to the environment, in particular a wet environment. The biodegradable materials may be hydrolyzable or water-soluble. For example, a biodegrable starch-based material or cellulose-based material could be used that wears away gradually as the tire life progresses. Starch derivatives include, for example, carboxymethyl starch, sulfoethyl starch or hydroxypropyl starch, or a combination thereof. Cellulose derivatives include, for example, carboxymethyl cellulose, hydroxyethyl cellulose, methyl cellulose, methyl hydroxyethyl cellulose, or ethyl hydroxyethyl cellulose, or a combination thereof.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A tire curing apparatus comprising
   a molding body having a negative form of a tread pattern therein for receiving a green tire compound, wherein the negative form of the molding body has recessed surfaces for forming raised tread elements and raised surfaces for forming grooves defining the raised tread elements in a positive form of the tread pattern formed in a cured tire;
   a temperature source for applying a vulcanization temperature to the green tire compound in the molding body; and
   a plurality of degradable sipe blades affixed to the recessed surfaces in the negative form of the tread pattern of the molding body and releasable therefrom for incorporation into the raised tread elements of the positive form of a tire tread cured in the molding body from the green tire compound for forming a plurality of sipes within the raised tread elements adjacent a ground-contacting top surface in the positive form of the tread pattern formed in the cured tire tread;
   wherein
     the material of the sipe blades is capable of maintaining the shape at the vulcanization temperature applied by the temperature source,
     the sipe blades comprise a water soluble polymer, a hydrolyzable polymer, a biodegradable polymer, or a combination thereof.

2. The tire curing apparatus of claim 1 further comprising a plurality of notches formed in the recessed surfaces, each for receiving a respective end of one of the plurality of degradable sipe blades for releasably affixing the degradable sipe blades to the molding body.

3. The tire curing apparatus of claim 1 wherein the plurality of degradable sipe blades are friction fit within the negative form of the tread pattern of the molding body for releasably affixing the degradable sipe blades to the molding body.

4. The tire curing apparatus of claim 1 wherein the material of the degradable sipe blades is a water soluble polymer, a hydrolyzable polymer, or a biodegradable polymer, or a combination thereof, that is capable of being removed from the cured tire tread by exposure to water.

5. A method of forming sipes in a tire tread, comprising:
   affixing a plurality of degradable sipe blades to recessed surfaces in a negative form of a tread pattern formed in a tire curing mold wherein the tire curing mold has recessed surfaces for forming raised tread elements and raised surfaces for forming grooves defining the raised tread elements in a positive form of the tread pattern formed in a cured tire tread;

forcing an uncured tread strip into the negative form of the tread pattern in the tire curing mold and thereby forcing the degradable sipe blades into portions of the uncured tread strip that correspond to the raised tread elements in the positive form;

applying a vulcanization temperature to the uncured tire strip in the tire curing mold to form a cured tire tread, wherein the sipe blades comprise a material capable of maintaining their shape at the vulcanization temperature;

removing the cured tire tread from the tire curing mold and thereby releasing the plurality of degradable sipe blades from the recessed surfaces such that the degradable sipe blades are embedded within the raised tread elements in the positive form of the tread pattern formed in the cured tire tread; and exposing the degradable sipe blades to water to remove the sipe blades and to leave a plurality of sipes formed in the raised tread elements.

6. The method of claim 5 wherein the affixing the plurality of degradable sipe blades to the recessed surfaces comprises inserting an end of each of the plurality of degradable sipe blades into a respective one of a plurality of notches formed in the recessed surfaces.

7. The method of claim 5 wherein the affixing the plurality of degradable sipe blades to the recessed surfaces comprises friction fitting the plurality of degradable sipe blades within the negative form of the tread pattern.

8. The method of claim 5 wherein the sipe blades comprise a vinyl polymer selected from the group consisting of: polyvinyl acetate and polyvinyl alcohol.

9. The method of claim 5 wherein the sipe blades comprise a hydrolyzable polyester.

10. The method of claim 9 wherein the sipe blades comprise polyglycolic acid, polylactic acid, plycaprolactone, polyhydroxybutyrate, or polyhydroxyvalerate, or copolymers or combinations thereof.

11. The method of claim 5 wherein the sipe blades comprise a biodegradable starch derivative or a biodegradable cellulose derivative.

12. The method of claim 5 wherein the sipe blades comprise carboxymethyl starch, sulfoethyl starch or hydroxypropyl starch, or a combination thereof.

13. The method of claim 5 wherein the sipe blades comprise carboxymethyl cellulose, hydroxyethyl cellulose, methyl cellulose, methyl hydroxyethyl cellulose, or ethyl hydroxyethyl cellulose, or a combination thereof.

14. The method of claim 5 wherein the sipe blades comprise a polyacrylic acid, a polyacryl amide, a polyvinyl alcohol, a polyoxyethylene, a polyester, or a polyamide, or copolymers or combinations thereof.

15. A method of forming sipes in a tire tread, comprising:

affixing a plurality of degradable sipe blades to recessed surfaces in a negative form of a tread pattern formed in a tire curing mold;

forcing an uncured tread strip into the negative form of the tread pattern in the tire curing mold and thereby forcing the degradable sipe blades into the uncured tread strip;

applying a vulcanization temperature to the uncured tire strip in the tire curing mold to form a cured tire tread, wherein the sipe blades comprise a material capable of maintaining their shape at the vulcanization temperature;

removing the cured tire tread from the tire curing mold and thereby releasing the plurality of degradable sipe blades from the recessed surfaces such that the degradable sipe blades are embedded in raised tread elements in a positive form of the tread pattern formed in the cured tire tread; and prior to use of the tire tread on a vehicle, actively applying water to the degradable sipe blades to remove at least a portion of the sipe blades and to leave a plurality of sipes formed in the raised tread elements.

16. The method of claim 15 wherein the affixing the plurality of degradable sipe blades to the recessed surfaces comprises inserting an end of each of the plurality of degradable sipe blades into a respective one of a plurality of notches formed in the recessed surfaces.

17. The method of claim 15 wherein the affixing the plurality of degradable sipe blades to the recessed surfaces comprises friction fitting the plurality of degradable sipe blades within the negative form of the tread pattern.

18. The method of claim 15 wherein the sipe blades comprise a vinyl polymer selected from the group consisting of: polyvinyl acetate and polyvinyl alcohol.

19. The method of claim 15 wherein the sipe blades comprise a hydrolyzable polyester.

20. The method of claim 19 wherein the sipe blades comprise polyglycolic acid, polylactic acid, plycaprolactone, polyhydroxybutyrate, or polyhydroxyvalerate, or copolymers or combinations thereof.

21. The method of claim 15 wherein the sipe blades comprise a biodegradable starch derivative or a biodegradable cellulose derivative.

22. The method of claim 15 wherein the sipe blades comprise carboxymethyl starch, sulfoethyl starch or hydroxypropyl starch, or a combination thereof.

23. The method of claim 15 wherein the sipe blades comprise carboxymethyl cellulose, hydroxyethyl cellulose, methyl cellulose, methyl hydroxyethyl cellulose, or ethyl hydroxyethyl cellulose, or a combination thereof.

24. The method of claim 15 wherein the sipe blades comprise a polyacrylic acid, a polyacryl amide, a polyvinyl alcohol, a polyoxyethylene, a polyester, or a polyamide, or copolymers or combinations thereof.

* * * * *

UNITED STATES PATENT AND TRADEMARK OFFICE
CERTIFICATE OF CORRECTION

PATENT NO. : 7,468,153 B2 Page 1 of 1
APPLICATION NO. : 11/095449
DATED : December 23, 2008
INVENTOR(S) : Marc Weydert et al.

It is certified that error appears in the above-identified patent and that said Letters Patent is hereby corrected as shown below:

Column 7

Line 40, "plycaprolactone" should be --polycaprolactone--.

Column 8

Line 38, "plycaprolactone" should be --polycaprolactone--.

Signed and Sealed this

Second Day of November, 2010

David J. Kappos
*Director of the United States Patent and Trademark Office*